(12) United States Patent
Huber

(10) Patent No.: US 10,390,412 B2
(45) Date of Patent: Aug. 20, 2019

(54) LIGHTING ARRANGEMENT FOR INDUSTRIAL IMAGE PROCESSING

(71) Applicant: B&R INDUSTRIAL AUTOMATION GMBH, Eggelsberg (AT)

(72) Inventor: Matthias Huber, Pleiskirchen (DE)

(73) Assignee: B&R INDUSTRIAL AUTOMATION GMBH, Eggelsberg (AT)

( * ) Notice: Subject to any disclaimer, the term of this patent is extended or adjusted under 35 U.S.C. 154(b) by 0 days.

(21) Appl. No.: 15/640,827

(22) Filed: Jul. 3, 2017

(65) Prior Publication Data

US 2018/0007765 A1 Jan. 4, 2018

(30) Foreign Application Priority Data

Jul. 4, 2016 (AT) ................ A50593/2016

(51) Int. Cl.
| | |
|---|---|
| *H04N 5/225* | (2006.01) |
| *H04N 5/232* | (2006.01) |
| *H05B 33/08* | (2006.01) |
| *H05B 37/02* | (2006.01) |

(52) U.S. Cl.
CPC ..... *H05B 37/0254* (2013.01); *H05B 33/0842* (2013.01); *H05B 33/0851* (2013.01); *H05B 37/0218* (2013.01); *H04N 5/2256* (2013.01); *H04N 5/23206* (2013.01); *Y02B 20/46* (2013.01)

(58) Field of Classification Search
CPC ............ H05B 33/0803; H05B 33/0815; H05B 33/0845; H05B 37/0227; H05B 33/0809; H05B 33/089; H05B 33/0842; H05B 33/0854

USPC ................ 315/152, 153, 297, 158, 186, 294
See application file for complete search history.

(56) References Cited

U.S. PATENT DOCUMENTS

| | | | |
|---|---|---|---|
| 9,504,129 B2 | 11/2016 | Vogt et al. | |
| 9,714,746 B2 * | 7/2017 | Tischler | ................. F21S 2/005 |
| 2004/0160199 A1 * | 8/2004 | Morgan | ................. A01M 1/04 |
| | | | 315/312 |

(Continued)

FOREIGN PATENT DOCUMENTS

| | | |
|---|---|---|
| DE | 10 2008 036 992 | 2/2010 |
| DE | 10 2011 017 681 | 10/2012 |

(Continued)

OTHER PUBLICATIONS

Search Report issued in Austria Patent Application No. A 50593/2016, dated May 17, 2017.

(Continued)

*Primary Examiner* — Wei (Victor) Chan
(74) *Attorney, Agent, or Firm* — Greenblum & Bernstein, P.L.C.

(57) ABSTRACT

In order to make flexible, reliable lighting possible for industrial image processing, it is provided that a lighting unit (2), having a lighting device (5) comprising a number of light sources (6), receives a set value of the lighting via a data bus from a lighting control unit (10), that the lighting unit (2) captures a state variable (Z) of the lighting unit (2) and/or the surroundings of the lighting unit (2), and that the lighting unit (2) adjusts the set value in a closed control loop separately and independently from the lighting control unit (10) in that a control variable for at least one light source (6) is calculated in the lighting unit (2) and adjusted at the at least one light source (6).

22 Claims, 2 Drawing Sheets

(56) References Cited

U.S. PATENT DOCUMENTS

| | | | |
|---|---|---|---|
| 2007/0273307 A1 | 11/2007 | Westrick et al. | |
| 2009/0021955 A1 | 1/2009 | Kuang et al. | |
| 2010/0204841 A1 | 8/2010 | Chemel et al. | |
| 2012/0105204 A1* | 5/2012 | Van Beeck | H05B 37/0227 340/8.1 |
| 2012/0127719 A1 | 5/2012 | Kuang et al. | |
| 2013/0221852 A1* | 8/2013 | Bowers | H05B 33/0863 315/131 |
| 2013/0264942 A1 | 10/2013 | Kuang et al. | |
| 2014/0055030 A1 | 2/2014 | Kuang et al. | |
| 2015/0158421 A1 | 6/2015 | Kuang et al. | |
| 2015/0312975 A1* | 10/2015 | Tischler | H01S 5/042 315/294 |
| 2016/0185288 A1 | 6/2016 | Kuang et al. | |
| 2017/0050560 A1 | 2/2017 | Kuang et al. | |

FOREIGN PATENT DOCUMENTS

| | | |
|---|---|---|
| DE | 10 2012 006 860 | 10/2013 |
| EP | 2 375 871 | 10/2011 |
| WO | 2009/011898 | 1/2009 |
| WO | 2009/129848 | 10/2009 |
| WO | 2015/097476 | 7/2015 |

OTHER PUBLICATIONS

Europe Search Report/Office Action conducted in counterpart Europe Patent Appln. No. 1717849,5 (dated Nov. 6, 2017).

Austria Office Action conducted in counterpart Austria Patent Appln. No. 3 A 50593/2016 (dated Aug. 31, 2018).

* cited by examiner

LIGHTING ARRANGEMENT FOR INDUSTRIAL IMAGE PROCESSING

CROSS-REFERENCE TO RELATED APPLICATIONS

The present application claims priority under 35 U.S.C. § 119(a) of Austria Patent Application No. A 50593/2016 filed Jul. 4, 2016, the disclosure of which is expressly incorporated by reference herein in its entirety.

BACKGROUND OF THE INVENTION

1. Field of the Invention

The present invention relates to a lighting arrangement for industrial image processing, having a lighting control unit and at least one lighting unit with a first data communication interface for connecting a data bus, wherein the lighting control unit is connected to the lighting unit via the data bus, and a lighting device with a number of light sources is arranged in the lighting unit. The invention further relates to a method for controlling a lighting of an industrial image processing.

2. Discussion of Background Information

In industrial image processing, a lighting field is illuminated by lighting, and the illuminated lighting field is captured and analyzed by an image acquisition unit, for example a camera. The result of the analysis can be used in many different ways and ranges from mere monitoring to open-loop and closed-loop controlling of a manufacturing process. In industrial image processing, lighting plays an important role because it must provide a preferably constant and defined illumination of the lighting field in order to ensure a reliable analysis of the captured images. Each light source, and particularly LEDs used in today's lightings, age with operating time and based on the manner they are operated. Therefore, lighting for industrial image processing is, as a rule, controllable in order to allow for a constant, defined illumination. As a rule, it is thus also necessary to purposefully adjust the lighting to each individual application of industrial image processing, which requires a specific flexibility of the lighting.

For example, WO 2015/097476 A2 describes a lighting system for industrial image processing. The lighting system comprises a lighting unit with lighting means (LEDs) which are controlled by a control unit. In the lighting unit, a memory is provided in which lighting-relevant data are stored which are to some extent updated during operation and read by the control unit and taken into account for the control of the lighting means. The lighting system is thus a closed, autarkic system. For adjusting the lighting to an extent which exceeds the possibilities of the lighting system, the lighting means in the lighting system must be adapted or a plurality of lighting systems must be used. However, in case of a plurality of lighting systems, it is difficult, due to the closed nature of the lighting systems, to adjust or control the joint operation or interaction of the lighting systems.

SUMMARY OF THE EMBODIMENTS

A problem addressed by the present invention is that of providing a lighting arrangement for industrial image processing and an associated control method which allows for great flexibility of the lighting and simultaneous reliable illumination.

According to the invention, this problem is solved in that the lighting control unit transmits a set value of the lighting via the data bus to the lighting unit, in that a second data communication interface for connecting a data bus is provided in the lighting unit, in that at least one measuring sensor for capturing at least one state variable of the lighting unit and/or the surroundings of the lighting unit is arranged in the lighting unit, in that a processing unit is arranged in the lighting unit for calculating a control variable for at least one light source of the lighting device from the predefined set value and the current value of the at least one state variable, and in that a lamp control unit is provided in the lighting unit, said lamp control unit controlling at least one light source of the lighting device with the calculated control variable. Providing a first and second data communication interface allows for the flexible expansion of the lighting arrangement with further lighting units according to requirement and application. It is thus possible to use standardized lighting units which are combined according to requirement. The lighting units work autonomously by adjusting these received set values separately and independently from one another and the lighting control unit. As a result, the lighting control unit is also not concerned about a possible aging or other change (e.g. a rise in temperature) of the lighting unit(s) because the lighting units implement the specification of the lighting control unit and thus automatically compensate for such changes. It is thus possible to also realize a reliable lighting that can also be maintained over a long period of time without significant changes.

In an advantageous embodiment, individual light sources are combined to groups which are controlled as a group by the processing unit and the lamp control unit. This, for example, allows in a simple manner to combine and jointly control light sources with different light characteristics, such as different light spectra. The grouping of the light sources can also be configurable, for example in the lighting control unit and/or the lighting unit itself.

For a simple voltage supply of the lighting unit, it can be connected to an external electrical connection and/or a data bus with power supply. Using a data bus with power supply does not require further wiring to the voltage supply, thus simplifying the lighting arrangement.

When a lighting unit sends a captured state variable to the lighting control unit via the data bus, the lighting control unit can monitor and analyze the function of the lighting unit in a simple manner. For example, the adherence of threshold values of specific state variables can be monitored, and an action can be initiated in due time before a lighting unit is damaged. This is supported if a unique identifier is assigned to the lighting unit, and the lighting unit sends a captured state variable with the unique identifier to the lighting control unit via the data bus. As a result, state variables in the lighting control unit can be assigned in a simple manner to a specific lighting unit.

In order to be able to synchronize the lighting unit(s) in a simple manner, a trigger input, which is connected to the processing unit, can be provided on the lighting unit in order to feed to the processing unit a trigger signal for activation and/or deactivation of the lighting device, a light source, or a group of light sources. Alternatively, a trigger message can also be sent to a lighting unit via the data bus.

If a memory unit is arranged in the lighting unit, in which operating data of the lighting unit and/or state variables are stored, subsequent analyses of the operation of a lighting unit is possible, e.g. to receive inferences about a failure cause in case of an error.

The serial interconnection of a plurality of lighting units via the data bus can be used in that a lighting unit relays a set value of the lighting, which was received from the lighting control unit, via a daisy-chain connection. This allows for a particularly simple operation of the lighting units.

The desired arrangement of the lighting units in the room for realizing the illumination task can be simplified if at least two lighting units are arranged on a rigid or adjustable connecting part, allowing in a simple manner for the adjustment of a defined position to each other.

With the use of a data bus for connecting different lighting units, the lighting arrangement can be supplemented in a simple manner with further bus devices by connecting them between two lighting units and/or by connecting a further bus device to the data bus on the lighting unit furthest away from the lighting control unit. This allows for the simple integration of the entire automation, in which the industrial lighting is integrated. This way, the industrial lighting can also be expanded by further functionalities provided by an additional bus device.

Other exemplary embodiments and advantages of the present invention may be ascertained by reviewing the present disclosure and the accompanying drawing.

BRIEF DESCRIPTION OF THE DRAWINGS

In the following, the present invention shall be explained in more detail with reference to FIGS. 1 to 3 which exemplarily, schematically, and without delimitation show advantageous embodiments of the invention.

DETAILED DESCRIPTION OF THE EMBODIMENTS

Figure 1:
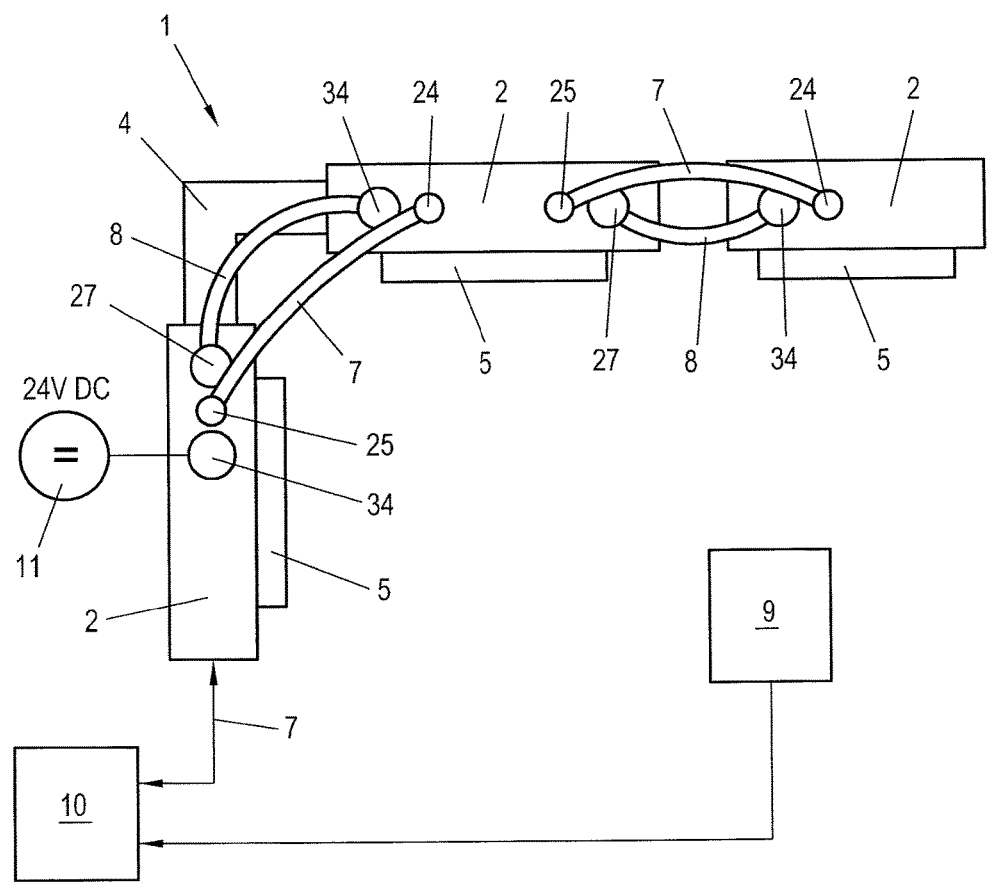
FIG. 1 shows a lighting arrangement according to the invention for industrial image processing.

FIG. 1 shows a lighting arrangement 1 according to the invention for industrial image processing. The lighting arrangement 1 comprises a number of lighting units 2, wherein in the example according to FIG. 1, three lighting units 2 are provided. The lighting arrangement 1 comprises at least one lighting unit 2. In case of a plurality of lighting units 2, they are series-connected, as shall be explained in more detail below. Each lighting unit 2 comprises a lighting device 5, for example in the form of one or more light sources, such as LEDs.

The individual lighting units 2 can be arranged individually in the room but can also be connected to one another via rigid or adjustable connecting parts 4 as indicated in FIG. 1. Due to the free arrangement in the room, the lighting arrangement 1 can practically be adjusted to any application. The connecting parts 4 can be adjustable in order to allow for different arrangements and alignments of the lighting units 2 in the room. It is also possible to provide different defined connecting parts 4 in order to be able to realize different alignments and arrangements. Thus, an individual design of the lighting arrangement 1, an optimal illumination according to requirements, a simple extension and a simple alteration of the lighting arrangement 1 is possible.

The lighting arrangement 1 further comprises an overriding lighting control unit 10. The lighting control unit 10 is connected to a lighting unit 2 via a data bus. For that purpose, for example, a bus cable 7 is used, wherein, however, a wireless connection is also conceivable. The lighting unit 2, which is connected to the lighting control unit 10, is in turn, via a data bus, connected to a next lighting unit 2, etc., thus resulting in a serial connection between the lighting control unit 10 and the lighting units 2.

In addition, at least two, preferably all lighting units 2 can also be series-connected via a supply cable 8 in order to loop a voltage supply through the individual lighting units 2. For that purpose, one of the lighting units 2 can be connected, via an appropriate interface, to an external electrical connection 11, for example a 24V DC connection, via which voltage is supplied to the lighting units 2. Voltage can also be supplied separately for each lighting unit 2.

Figure 2:
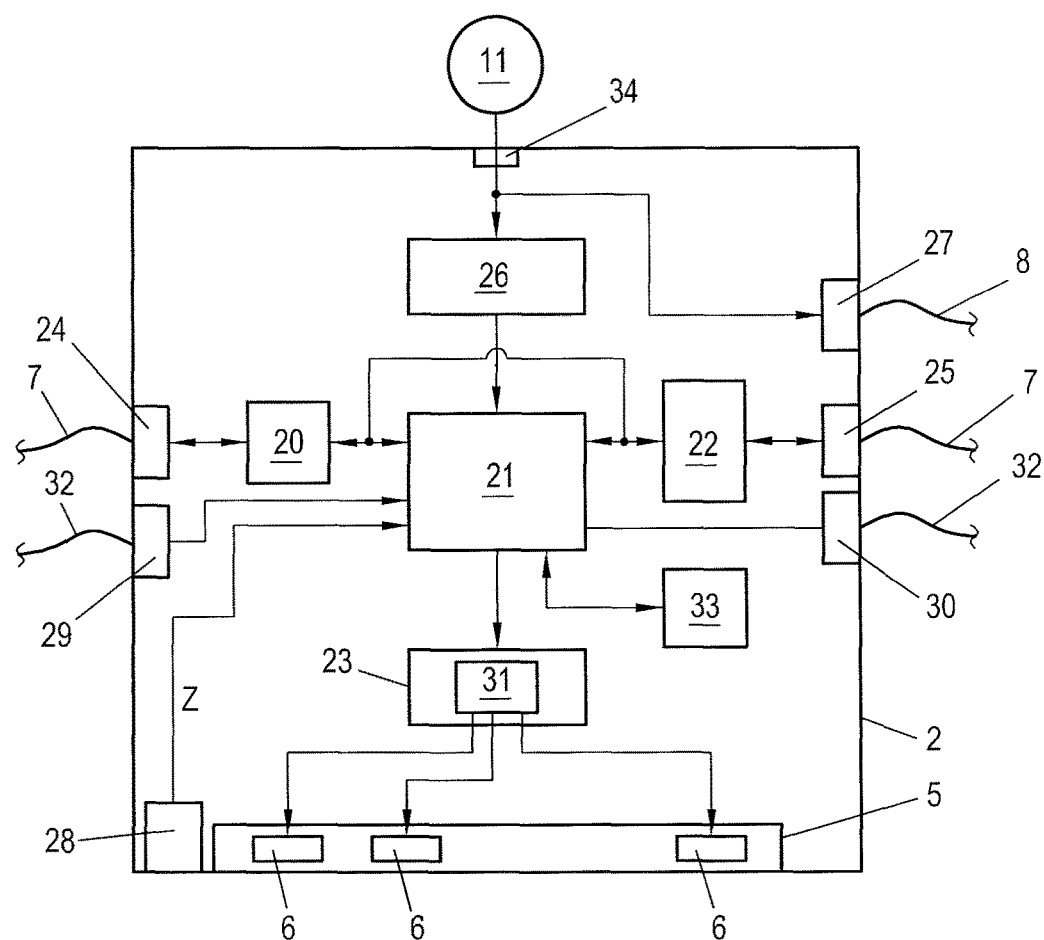
FIG. 2 shows an advantageous structure of a lighting unit of the lighting arrangement.

A lighting unit 2 in a preferred embodiment is shown in FIG. 2 and will be described in the following with reference to FIG. 2. The lighting unit 2 comprises a first data communication interface 20 for communicating data via the data bus with a bus protocol. For that purpose, a plug 24 can also be provided on the lighting unit 2 in order to connect the data communication interface 20 to a data bus, for example in the form of a bus cable 7. In the lighting unit 2, a second data communication interface 22 is arranged which is connected to the first data communication interface 20 in order to loop through the data bus (daisy-chain). The first data communication interface 20 can also be connected to a processing unit 21 which in turn can be connected to the second data communication interface 22 if the processing unit 21 serves as bus converter, i.e. if, for example the inbound data bus or the bus protocol used and the outbound data bus or the bus protocol used are different from one another. However, there are also so-called data communication protocols with summation frame, in which all bus participants write data or from which all bus participants read data. In this case, the data can also be communicated via the processing unit 21. A data bus, for example in the form of a bus cable 7, can in turn be connected to the second data communication interface 22 via a plug 25 for communication with a bus protocol. The lighting unit 2 is connected to the lighting control unit 10 or the processing unit 21 of a subsequent lighting unit 2 via the first data communication interface 20 or the plug 24, and the second data communication interface 22 or the plug 25. The plugs 24, 25 can also be configured as screw connection which is advantageous for the industrial application.

In addition, a memory unit 33 can naturally also be provided in the lighting unit 2, wherein said memory unit 33 can also be connected to the processing unit 21. Of course, the memory unit 33 can also be part of the processing unit 21. In the memory unit 33, for example, configuration data or other data required for the operation can be stored.

The function of the processing unit 21, and possibly also the memory unit 33, is thus also to receive and analyze data communication which was received via the data bus and the first data communication interface 20, e.g. from a lighting control unit 10 or an upstream lighting unit 2, and to possibly forward said data communication via the second data communication interface 22 to the subsequent lighting units 2, provided that there is a subsequent unit and the processing unit 21 is supposed to serve as a bus converter, and provided that this is required by the data communication protocol. Reversely, data communication can also be received from a lighting unit 2 via the second data communication interface 22 and transmitted via the processing unit 21 and the first data communication interface 20 in the direction of the lighting control unit 10 if the processing unit 21 is supposed to also serve as a bus converter, or provided that this is required by the data communication protocol. Otherwise, data can also be received directly from the second data communication interface 22, looped through the first data communication interface 20 and, for example, forwarded to the lighting control unit 10.

For example, an Ethernet-based data communication protocol, such as Ethernet Powerlink, can be used as bus protocol. Of course, it is also possible to use a proprietary data communication protocol, such as the applicant's X2X. However, any other, also standardized data communication protocol can of course be used as bus protocol.

The lighting unit 2 also comprises a voltage supply 26, preferably a 24V DC-voltage supply, as is common in industrial automation, in order to provide the energy supply of the lighting unit 2, particularly also for the lighting device 5. The voltage supply 26 can be connected via an electrical interface 34, e.g. a plug contact, to an external electrical connection 11, preferably a 24V DC connection. However, it would also be possible to use a data bus that provides a power supply, for example Ethernet Powerlink with power supply (Power over Ethernet, PoE). In such case, the voltage supply 26 could be connected to plug 24, 25 of the first data communication interface 20 or the second data communication interface 22. The lighting unit 2 can also have a supply connector 27 in order to pass on the voltage supply 26 to connected lighting units 2. For example, a lighting unit 2 can thus be connected via the supply connector 27 to the electrical interface 34 of a different lighting unit 2. For that purpose, supply cables 8 can also be provided in order to loop the voltage supply through all lighting units 2. If a data bus with power supply is used, the supply connector 27 and the electrical interface 34 are preferably not used in order to save cables. The supply voltage is instead forwarded via the data communication interfaces 24, 25 to the voltage supply 26.

Furthermore, a lamp control unit 23 can be provided in the lighting unit 2 which is connected to and controlled by the processing unit 21. However, the lamp control unit 23 can also be integrated in the processing unit 21, for example as software to be run in the processing unit 21. The lamp control unit 23 is connected to the lighting device 5 of the lighting unit 2 or to the individual light sources 6 of the lighting device 5. Basically, the lighting device 5 can comprise a multiplicity of individual light sources 6 which can be controlled either individually or in defined groups by the lamp control unit 23 or the processing unit 21. It is also possible to use different types of light sources 6, for example with different light colors or light spectra. In an advantageous embodiment, LEDs are used as light sources 6. For controlling the light sources 6, the lamp control unit 23 can comprise an energy supply 31, e.g. a lighting voltage supply or lighting power supply which can also be designed so as to be controllable. In the case of LEDs as light source 6, the lamp control unit 23 as energy supply 31 preferably comprises a controllable constant current source per LED or per a specific group of LEDs. Via the lamp control unit 23 or the processing unit 21, advantageously, light intensity, light color, illumination duration and/or the illumination direction of the light emitted from the lighting device 5 can be particularly controlled by appropriately controlling the individual light sources 6 or the groups of individual light sources 6.

A number of measuring sensors 28 can also be arranged in or on the lighting unit 2 in order to capture at least one state variable Z of the light emitted by the lighting device 5 and/or the lighting unit 2. Such a state variable Z can, for example, be the emitted light intensity, the light color, the temperature in the lighting unit 2, the ambient temperature, the ambient light intensity, etc. The at least one captured state variable Z can, via the processing unit 21 and the first data communication interface 20, also be sent to the lighting control unit 10.

The lighting unit 2 is controlled via the processing unit 21. For that purpose, the lighting unit 2 receives set values from the lighting control unit 10 for the desired illumination, i.e. a set value, e.g. for the light intensity and/or the light color. Preferably, light intensity, wavelength (color or spectral range(s)), illumination duration, etc., are controlled, wherein a plurality of different lighting characteristics can also be controlled simultaneously. The processing unit 21 subsequently adjusts these set values during operation. The processing unit 21 receives feedback about the current state of the illumination from the measuring sensors 28 in the form of the captured state variables Z. A closed control loop is thus formed which allows the processing unit 21 to adjust the required radiating characteristic of the illumination and maintain it during operation. The processing unit 21 calculates at regular intervals (scanning rate of the control system) control variables for the individual light sources 6 and/or for a group of light sources 6 from the predefined set values and the state variable Z captured by the measuring sensors 28, said control variables then being converted by the lamp control unit 23, for example by applying appropriate current or voltage to individual light sources 6 or groups of light sources 6 in order to adjust the predefined set value. For this purpose, the predefined set values are preferably stored in the memory unit 33. Of course, a suitable controller for closed-loop control of the lighting or a light source 6 or a group of light sources 6 can also be implemented in the processing unit 21.

The state variables Z of the lighting unit 2, which were captured by the measuring sensors 28, can also be sent to the lighting control unit 10. The lighting control unit 10 thus knows the current state of each lighting unit 2 and is thus capable of monitoring the operation of the lighting arrangement 1. For example, threshold values for specific state variables Z, which are admissible for a lighting unit 2, can be stored in the lighting control unit 10, and the compliance of said threshold values is monitored by the lighting control unit 10. If such a threshold value, for example a maximum current of a light source 6, is exceeded, the lighting unit 2 can be instructed, via the data bus, to take a specific action. For example, the lighting unit 2 can be instructed to deactivate a specific light source 6. This can be compensated due to the simultaneous control of all light sources 6. The lighting control unit 10 can thus also trigger a replacement or maintenance of a lighting unit 2.

A lighting unit 2 preferably has a unique identifier which, for example, is stored via a hardware-based resistor array or in the memory unit 33. In every message to the lighting control unit 10, a lighting unit 2 also transmits the identifier. Via the identifier, the lighting control unit 10 can thus clearly identify each lighting unit 2 and assign received state variables Z or status information. The lighting control unit 10 can therefore also call up permanently stored parameters and properties and/or determine, e.g. the threshold values for the control.

Furthermore, a trigger input 29 can be provided on the lighting unit 2 which can be used for temporally synchronizing the individual lighting units 2. A digital or analog trigger signal at the trigger input 29 can be analyzed by the processing unit 21 and be used for controlling, e.g. activating or deactivating, the lighting device 5. The trigger signal can also be emitted by a trigger output 30, and so the trigger signal can be passed on to subsequent, connected lighting units 2. A trigger cable 32 can also be provided for such purpose. Instead of a separate trigger input 29, a trigger message can also be received via the data bus and analyzed in the processing unit 21. Instead of emitting a trigger signal at a trigger output 30, a trigger message can be passed on via the data communication interface 22 to subsequent, connected lighting units 2. In case of trigger messages via a data bus, a separate trigger input 29 and/or a separate trigger output 30 can of course be foregone, and they do not have to be wired.

For the industrial use even in crude surroundings, the lighting unit 2 including lighting device 5 is preferably arranged in a closed housing, which can be configured to be waterproof and/or dustproof.

Of course, operating data of the lighting unit 2 can also be stored in the memory unit 33, e.g. in order to receive inferences about a failure cause in case of an error. For example, the hours of operation can be counted and stored, as can values of a state variable Z or also the temporal progress of a state variable Z, for example in order to be analyzed at a later date. It is also possible to use the temporal progress of a state variable Z in the processing unit 21 for the control of the lighting device 5.

For the industrial lighting, it is first determined, how many lighting units 2 are required for the necessary illumination, and how they have to be arranged in the room. The set values for the realization of the lighting task are then transmitted to the lighting units 2 by the lighting control unit 10. The lighting units 2 subsequently realize the predefined set values autonomously and independently from the lighting control unit 10. From the present lighting units 2, status information, such as captured state variables Z, can be transmitted to the lighting unit 2 with status messages of the bus protocol. However, the lighting control unit 10 itself can also capture measurements from the measuring sensors 9 (FIG. 1) and analyze them for the control of the lighting arrangement 1. For example, the light intensity in the illuminated area can be captured. The lighting control unit 10 can also send a trigger signal or trigger messages via the data bus to the lighting units 2.

Figure 3:
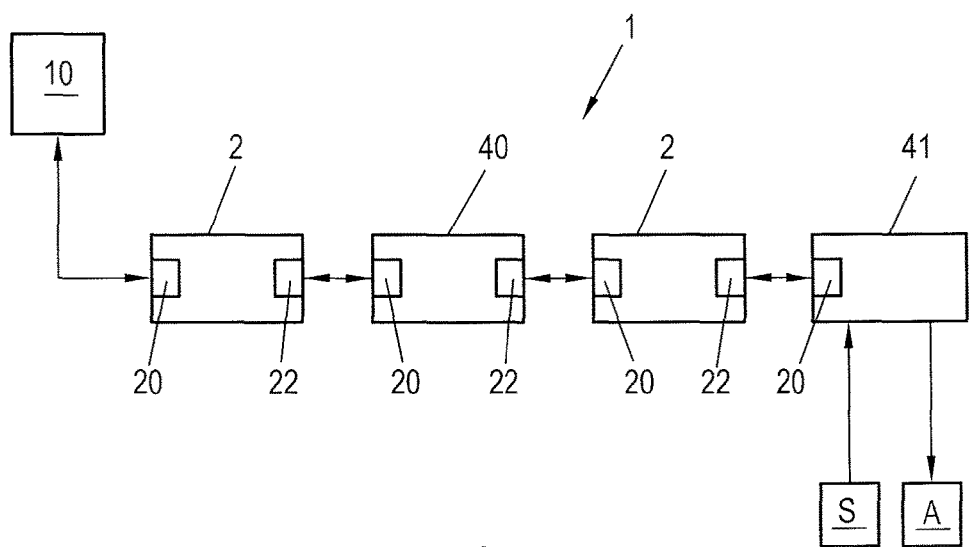
FIG. 3 shows the expansion of the lighting arrangement by further bus devices.

However, it is also possible to interpose another bus device 40, 41 between two adjacent lighting units 2 or connect it to a lighting unit 2 as is shown in FIG. 3. A second data communication interface 22 of a lighting unit 2 can, for example, be connected to a first data communication interface 20 of a bus device 40, 41, the second data communication interface 22 of which can in turn be connected to another bus device or a lighting unit 2. It is thus possible in a simple manner to expand the lighting arrangement 1 by further functionalities. For example, this way, a camera of the industrial image processing can be incorporated as bus device 40. As a result, it would thus be possible to monitor and/or control the camera via the same data bus with the lighting control unit 10. A bus device 41 could also serve as I/O (input/output) interface, with which the sensor data from sensors S can be captured by the lighting control unit 10, or actuators A, e.g. an adjustment of a connecting part 4, can be controlled by the lighting control unit 10. Of course, a plurality of such further bus devices can be interposed between two lighting units 2. This way, the complete integration of the lighting arrangement 1 into an automation of a facility can be realized.

What is claimed:

1. A lighting arrangement for industrial image processing, comprising:
    a lighting control unit; and
    at least one lighting unit comprising:
        a first data communication interface connectable to a data bus, wherein the lighting control unit, which is separate from the at least one lighting unit, is connected to the first data communication interface of the at least one lighting unit via the data bus;
        a lighting device with a number of light sources, wherein the lighting control unit transmits a predefined set value for light from the lighting arrangement via the data bus to the at least one lighting unit;
        a second data communication interface connectable to the data bus,
        at least one measuring sensor for capturing at least one state variable of the at least one lighting unit and/or surroundings of the at least one lighting unit;
        a processing unit for calculating a control variable for at least one of the light sources of the lighting device from the predefined set value and a current value of the at least one state variable, and
        a lamp control unit configured to control the at least one light source of the lighting device with the calculated control variable,
        wherein, within the at least one lighting unit, the first data communication interface is directly connected to the second data communication interface to bypass the processing unit.

2. The lighting arrangement according to claim 1, wherein the at least one light source comprises a group of lights sources of the number of light sources of the at least one lighting unit,
    wherein the processing unit calculates a control variable for the group of light sources, and the lamp control unit controls the group of light sources with the calculated control variable.

3. The lighting arrangement according to claim 1, wherein the at least one light source comprises a plurality of light sources,
    wherein the processing unit calculates different control variables for one of the plurality of light sources groups of light sources formed within the plurality of light sources, and the lamp control unit controls the plurality of light sources or groups of light sources with the calculated different control variables.

4. The lighting arrangement according to claim 1, wherein a voltage supply, which is arranged in the at least one lighting unit, is connected to at least one of an external electrical connection or the data bus with power supply for supplying voltage for the at least one lighting unit.

5. The lighting arrangement according to claim 1, wherein the at least one lighting unit sends the captured state variable to the lighting control unit via the data bus.

6. The lighting arrangement according to claim 5, wherein a unique identifier is assignable to the at least one lighting unit, and the at least one lighting unit is configured to send the captured state variable and the unique identifier to the lighting control unit via the data bus.

7. The lighting arrangement according to claim 1, wherein a trigger input, which is connected to the processing unit, is provided on the at least one lighting unit in order to feed to the processing unit a trigger signal for activation and/or deactivation of the lighting device, a light source, or a group of light sources.

8. The lighting arrangement according to claim 1, wherein the at least one lighting unit further comprises a memory unit, in which operating data of the at least one lighting unit and/or state variables are stored.

9. The lighting arrangement according to claim 1, wherein the at least one lighting unit comprises a plurality of lighting units, wherein individual lighting units are series-connected by the data bus to receive the data bus data via their first data communication interfaces and their second data communication interfaces.

10. The lighting arrangement according to claim 9, wherein, within individual ones of the plurality of lighting units, the first data communication interface and the second data communication interface are further connected to one another via the processing unit.

11. The lighting arrangement according to claim 9, wherein the plurality of lighting units comprises at least an upstream and a downstream lighting unit, and
wherein the upstream lighting unit loops the predefined set value of the lighting, which was received from the lighting control unit via the data bus, to the downstream lighting unit, which is further away from the lighting control unit, via the data bus.

12. The lighting arrangement according to claim 9, wherein at least two of the plurality of lighting units are arranged on a rigid or adjustable connecting part.

13. The lighting arrangement according to claim 9, wherein for current supply, at least two of the plurality of lighting units are connected via a supply cable and/or the data bus with power supply.

14. The lighting arrangement according to claim 9, wherein at least two of the plurality of lighting units are connected to one another via a trigger cable in order to loop a trigger signal from one of the at least two lighting units through to the other of the at least two lighting units.

15. The lighting arrangement according to claim 9, wherein a further bus device is connected to the data bus between two of the plurality of lighting units and/or to an individual lighting unit of the plurality of lighting units, which is furthest away from the lighting control unit.

16. A method for controlling lighting for industrial image processing, comprising:
receiving, in at least one lighting unit having a lighting device comprising a number of light sources, a set value of the lighting via a data bus from a lighting control unit that is separate from the at least one lighting unit,
capturing, in the at least one lighting unit, a state variable of the at least one lighting unit and/or surroundings of the at least one lighting unit, and
separately and independently from the lighting control unit, adjusting, via the at least one lighting unit, the set value in a closed control loop,
wherein a control variable for at least one light source of the number of light sources is calculated in a processing unit within the at least one lighting unit and adjusted at the at least one light source,
wherein the data bus is connected to a first data communication interface of the at least one lighting unit, and
wherein, within the at least one lighting unit, the first data communication interface is directly connected to a second data communication interface of the at least one lighting unit to bypass the processing unit so that the set value to be looped through the at least one lighting unit from the first data communication interface to the second data communication interface bypasses the processing unit.

17. The method according to claim 16, wherein the number of light sources comprises a group of light sources controlled with the calculated control variable.

18. The method according to claim 16, wherein the at least one lighting unit sends a captured state variable via the data bus to the lighting control unit.

19. The method according to claim 16, wherein the at least one lighting unit receives a trigger signal via a trigger input or a trigger message via the data bus and controls the activation and/or deactivation of one of: the lighting device, one light source of the number of light sources, or a group of light sources of the number of light sources with said trigger signal or trigger message.

20. The method according to claim 19, wherein the at least one lighting unit comprises at least an upstream and a downstream lighting unit connected together by the data bus, and
wherein the upstream lighting unit loops the trigger signal via a trigger output or the trigger message via the data bus through to the downstream lighting unit.

21. The method according to claim 18, wherein a unique identifier of the at least one lighting unit is sent to the lighting control unit with the captured state variable.

22. The lighting arrangement according to claim 1, wherein the data bus data bypasses the processing unit via the direct connection between the second data communication interface and the first data communication interface.

* * * * *